United States Patent [19]

Krall

[11] 4,296,900
[45] Oct. 27, 1981

[54] AIRFOIL CONSTRUCTION

[75] Inventor: Kenneth M. Krall, Arlington, Tex.

[73] Assignee: Vought Corporation, Dallas, Tex.

[21] Appl. No.: 32,438

[22] Filed: Apr. 23, 1979

[51] Int. Cl.³ ............................................. B64C 3/48
[52] U.S. Cl. .................................... 244/219; 244/207
[58] Field of Search ............... 244/203, 204, 207, 208, 244/212, 213, 215, 219, 53 B; 137/15.1

[56] References Cited

U.S. PATENT DOCUMENTS

| | | | |
|---|---|---|---|
| 1,760,726 | 5/1930 | Triplett | 244/219 |
| 1,803,915 | 5/1931 | Parmele | 244/219 |
| 1,918,897 | 7/1933 | Colburn | 244/219 |
| 2,886,264 | 5/1959 | Seager | 244/207 |
| 2,964,264 | 12/1960 | Multhopp | 244/207 |
| 3,132,826 | 5/1964 | Ellingsworth, Jr. et al. | 244/212 |
| 3,265,331 | 8/1966 | Miles | 244/53 B |
| 3,724,784 | 4/1973 | von Ohain et al. | 244/207 |
| 3,807,663 | 4/1974 | Bartoe, Jr. | 244/207 |
| 3,887,147 | 6/1975 | Grieb | 244/207 |

Primary Examiner—Galen L. Barefoot
Attorney, Agent, or Firm—James M. Cate; Charles W. McHugh

[57] ABSTRACT

A dual-configuration airfoil having a thin profile which is adapted to foster high-speed flight, and having a pivotable portion on the upper surface which is movable upwardly for selectively increasing the thickness of the airfoil. In one embodiment, the pivotable portion pivots about an axis which coincides generally with the leading edge of the airfoil. The thickness of the airfoil when the pivotable portion is fully raised is about twice the thickness of the airfoil when the pivotable portion is fully retracted. A rigid connecting section forms part of the airfoil's upper surface immediately behind the pivotable portion. The connecting section is also movable, such that a substantially continuous and rigid surface is presented to the air moving over the airfoil's upper surface during such times as the pivotable portion is being pivoted upward and downward—as well as when the pivotable portion is fixedly held. A rearwardly directed nozzle is located adjacent the aft edge of the pivotable portion, and it is oriented such that it can discharge a gaseous fluid (e.g., air) over the connecting section. A source of pressurized fluid, such as an engine-driven compressor or a fan, is adapted to be connected with said nozzle. And, a control or regulating valve is provided for adjusting the discharge of fluid from said source over the connecting section. Preferably, the connecting section is configured so as to cause the air which flows thereover to decelerate in a controlled manner, and preferably the deceleration occurs faster nearer the leading part of said section than near the trailing part thereof. In one embodiment, the means for adjusting the discharge of fluid from said nozzle includes a linkage which is connected to a movable control surface, such as a trailing edge flap. In this way, moving the flap down to a landing position can automatically cause fluid to be discharged from the nozzle and over a selected portion of the airfoil.

4 Claims, 7 Drawing Figures

AIRFOIL CONSTRUCTION

This invention relates generally to airfoils, and more particularly to an airfoil having a relatively thin configuration for high-speed flight and a relatively thick configuration for low-speed flight. In the low-speed configuration, a source of pressurized fluid is put in communication with a nozzle so as to cause fluid to be discharged over a particular portion of the airfoil.

It is well known to provide relatively thin airfoils for airplanes that are designed for high-speed flight. It is also well known that relatively thick airfoils can be employed to produce high lift characteristics that are essential for relatively low-speed flight. However, there is a perennial problem in trying to establish a satisfactory compromise between the desire to have outstanding lift characteristics at low speed and minimum drag at high speeds. One way in which attempts have been made to solve this problem is to provide dual-configuration airfoils, which are exemplified by U.S. Pat. Nos. 1,194,878 to Roessler and 1,760,726 to Triplett. While the concept of a dual-configuration airfoil may well be old, the absence of such a configuration on modern-day aircraft adequately testifies to the fact that ambitious proposals made long ago have not fulfilled the role that was envisioned for them.

It is also known to utilize blowing air over a trailing edge flap or the like in order to enhance the lift that is realizable from conventional airfoils. It is believed to be a fair statement, however, that constructions which have utilized blowing air over a trailing-edge flap or the like have required relatively large expenditures of power in comparison with the benefits gained therefrom. Accordingly, it is an object of this invention to provide a construction which constitutes an improvement over some previously attempted designs. In particular, it is an object of this invention to provide a boundary layer control system in which there is a particularly efficacious control of air stream velocity over the top of an airfoil.

An additional object is to provide an airfoil which provides substantial lift with a relatively modest expenditure of power.

A further object is to achieve a substantial portion of the overall lift near the leading edge of an airfoil, thereby reducing trimming requirements which would otherwise be present in an aircraft.

Another object is to provide a construction to improve the low speed lifting characteristics of a thin, high speed airfoil.

Briefly, the present invention includes hinging a frontal portion of the upper surface of an airfoil at the leading edge thereof. Whenever the hinged portion is elevated with respect to the main airfoil, a rigid connecting section is exposed between the rear-most portion of the hinged section and the fixed surface of the airfoil. A rearwardly directed nozzle is located adjacent the aft edge of the pivotable portion, and it is oriented rearwardly such that it can discharge a gaseous fluid over the connecting section at the appropriate time. In an optimized embodiment, a control means is provided for adjusting the discharge of fluid over the connecting section in accordance with certain flight parameters or the position of certain movable structure on the aircraft. Ideally, the accelereated flow which is obtained at the frontal portion of the airfoil is caused to decelerate relatively rapidly over the connecting section; if the largest rate of decrease occurs as soon as possible, larger total decelerations may be achieved before there is a tendency to experience flow separation. A further advantage of the construction disclosed herein is that a larger portion of the airfoil's lift is carried by the airfoil's leading edge, thereby reducing trimming requirements. Additionally, providing a blowing jet as disclosed herein at a position relatively near the leading edge of the airfoil produces generally favorable boundary layer characteristics over the entire airfoil, which reduces the tendency of the air flow to separate, thereby reducing drag. These and other advantages will be apparent from the specification and claims, and from the drawings provided herewith in which:

Figure 2:
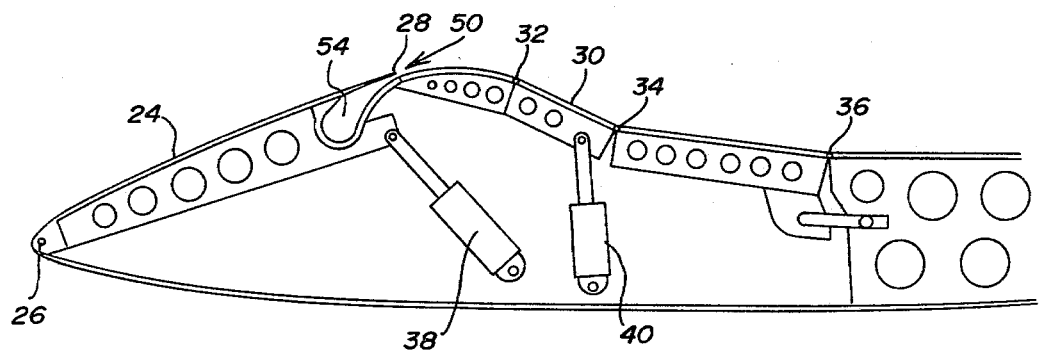
FIG. 2 is a fragmentary, cross-sectional view of the airfoil shown in FIG. 1, with the pivotable section shown in its fully elevated position, such as it might be for low speed flight.
Figure 7:
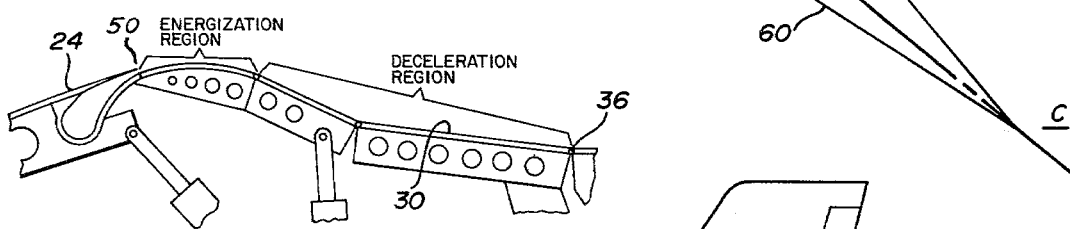
Figure 6:
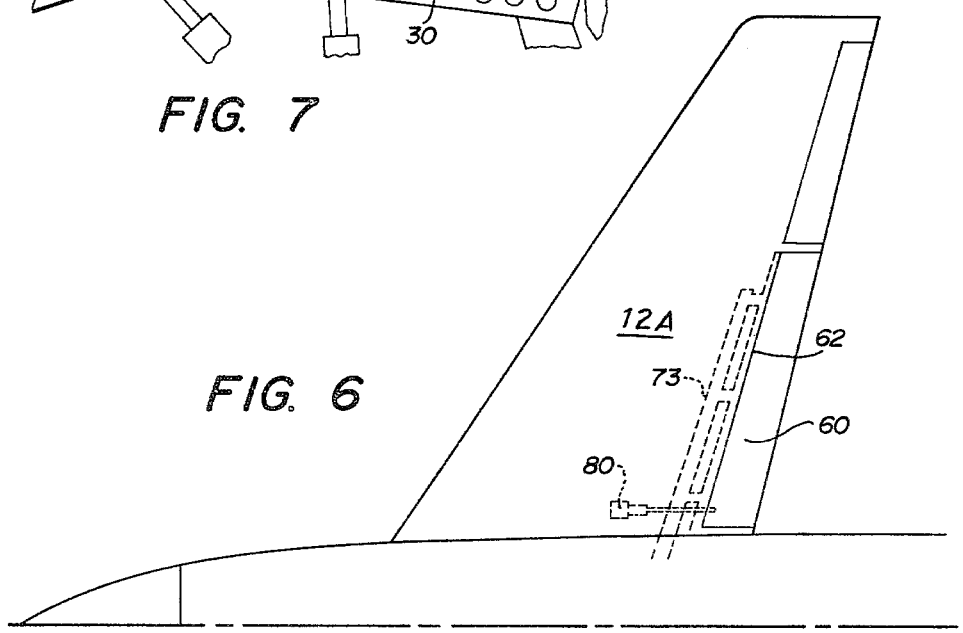

FIG. 6 is a fragmentary top view of an aircraft having a boundary layer control system adapted to discharge a blowing jet over a trailing edge flap, and FIG. 7 is a fragmentary view of an airfoil section, comparable to that shown in FIG. 2, with the energization region (where the blowing jet is most effective) and the deceleration region (where diffusion or deceleration takes place) being identified adjacent the structural pieces—with it being understood that, in actual practice, the boundaries of these two regions are not necessarily precise.

Figure 1:
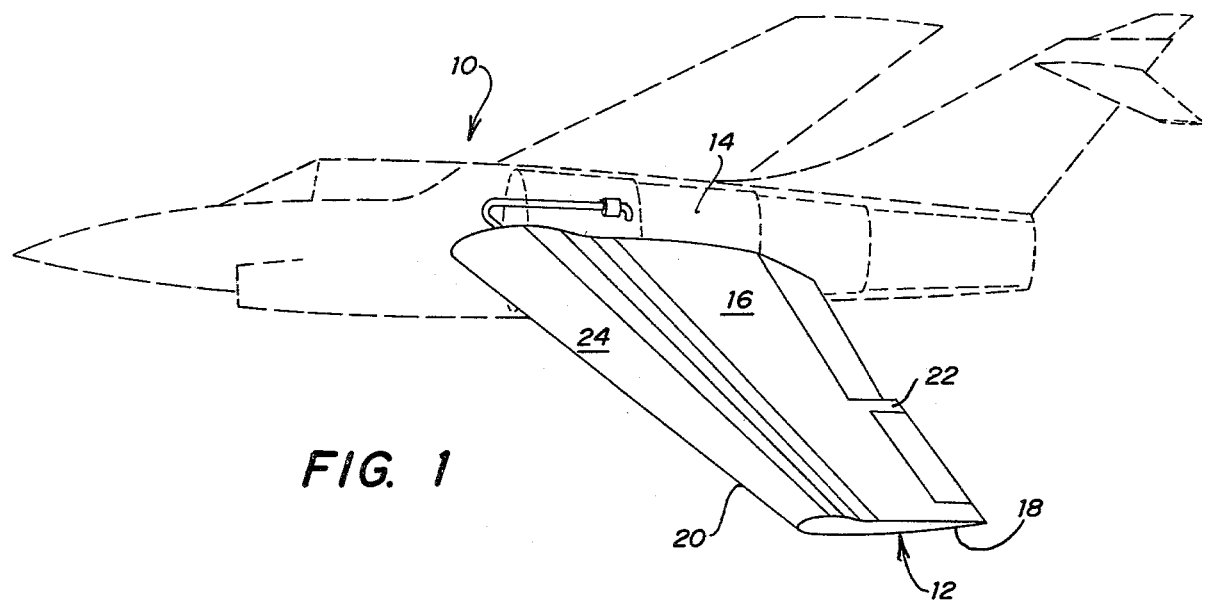
FIG. 1 is a perspective view of an exemplary aircraft having an airfoil of the claimed construction.

With initial reference to FIG. 1, an airplane 10 having an airfoil 12 is shown in an embodiment having a jet engine 14 which is adapted to serve as a source of pressurized fluid (particularly, hot gases bled from a compressor). The airfoil 12 has an upper surface 16 and a lower surface structure 18, both of which connect the leading edge 20 with the airfoil's trailing edge 22. Referring additionally to FIG. 2, a frontal portion 24 of the upper surface structure 16 is pivotable upward about a hinge line 26 that coincides approximately with the leading edge of the airfoil. When pivoted upward, the structural portion 24 substantially increases the thickness of the airfoil 12; in general, the thickness of the airfoil when the pivotable portion is fully raised is about twice its thickness when the pivotable portion is fully retracted. Another facet of the construction is that the chordwise length of the pivotable portion 24 is substantially less than the chord length, e.g., less than ¼ of the airfoil chord length. The aft edge 28 of the pivotable portion 24 is preferably rather sharp, as a result of the rear-most part of the pivotable portion being relatively thin.

A connecting section 30 forms an integral part of the airfoil upper surface 16 immediately aft of the pivotable plate 24. Said section 30 is segmented as required and provided with hinges at spaced locations (such as 32, 34 and 36) so that a substantially continuous and rigid surface is presented to the air moving over the upper surface structure 16, not only during such times as the plate portion 24 is being pivoted upward and downward but also when the pivotable portion is fixedly held. Appropriate mechanisms such as hydraulic actuators 38, 40 are employed to move the structural elements 24, 30 to and from their respective positions. By use of the term "rigid" as applied to section 30, it is intended to refer to structural plates (of metal or the like) which are not flexible. This term is used in order to clearly differentiate the present construction from that shown in U.S. Pat. No. 3,136,501 to Barber in which a flexible rubber boot is employed on top of an airfoil. And, while the connecting section 30 is certainly "rigid", it is not immovable.

Immediately ahead of the connecting section 30 is a rearwardly directed nozzle 50, which is located adjacent the aft edge 52 of the pivotable portion 24. The nozzle is oriented such that it can discharge a gaseous fluid over the connecting section 30. This is accomplished by supplying pressurized fluid from a source (such as a fan or compressor) to a plenum 54 below the hinged plate 24. A control means, such as a valve, is provided for adjusting the quantity of pressurized fluid admitted to the plenum 54, which thereby serves to adjust the discharge of fluid over the connecting section 30. If the source of pressurized fluid is a fan, the volume of fluid discharged over the connecting section 30 can be adjusted by affecting the rpm of the fan, so the control means in such a case could actually constitute a conventional fan speed regulator.

Figure 4:
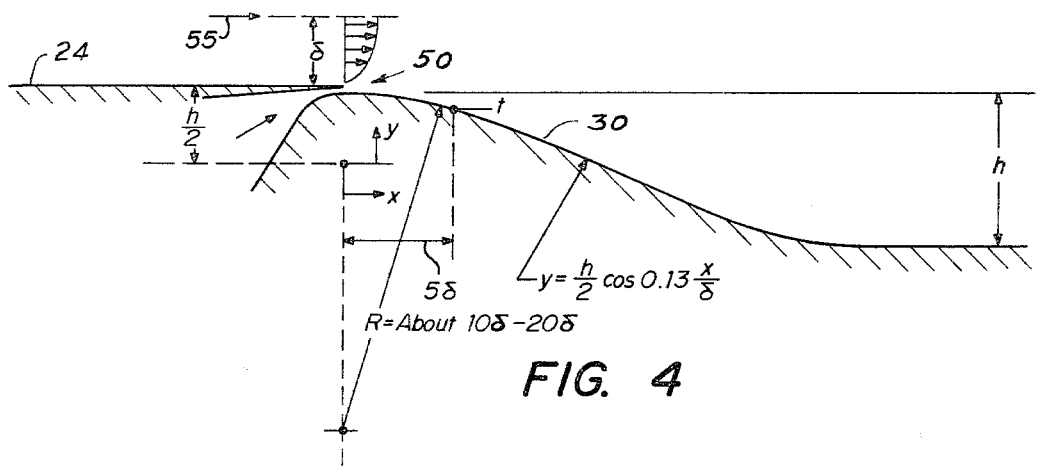
FIG. 4 is a drawing of the ideal configuration for causing air flow (which is moving in a left-to-right direction in this figure) to diffuse with a minimal tendency to separate from the adjacent wall.

Referring next to FIG. 4, a diagrammatic representation of certain important parameters of the construction is provided. Specifically, it will be seen that the connecting section 30 has a generally concave shape with a compound radius; and the radius of most portions of the connecting section is within the range of 0.2 to 4.0 times the chord. One result of the configuration shown in FIG. 4 is that the main airstream which approaches the connecting section in a direction parallel to arrow 55 will tend to decelerate as it passes over said connecting section. And, it has been found experimentally that optimum results are obtained when this deceleration occurs at a faster rate near the leading part of the section 30 rather than near the trailing part thereof. This result can be accomplished by establishing a profile for the connecting section which is defined by the relationship $y = (h/2) \cos 0.13(x/\delta)$, wherein y is the elevation above a zero point as shown in FIG. 4, and x is the length downstream from the nozzle opening, and $\delta$ is the boundary layer thickness that will typically be manifested at the aft edge of the pivotable section 24.

With regard to the quantity of gaseous fluid which is expelled from the nozzle 50, it will be important to note that the sole purpose of the fluid jet in this invention is to energize the boundary layer that accumulated ahead of the nozzle 50; the jet is not used to turn or to increase the energy of the mainstream flow. With the construction disclosed herein, an energization zone is provided which optimizes boundary layer mixing; ideally, the shape and length of said energization zone are such as to retain a substantially constant velocity until the accumulated boundary layer deficit is eliminated. Typically, the energization length will be such that sufficient mixing will be completed within a distance equal to 4 to 5 boundary layer thicknesses.

At the end of the relatively short energization zone, the mainstream boundary layer over pivotable portion 24 will have been substantially eliminated, and it will have been replaced by a very thin boundary layer between the blowing jet and the adjacent wall. According to the invention, deceleration of the air flow over the connecting section 30 is accomplished gradually, but the configuration is established so that the rate of deceleration is greatest on the initial portion, decreasing monotonically to zero at the end of what may be referred to as a "diffuser section". That is, an abrupt and rapid deceleration is deliberately introduced relatively close to the nozzle 50. This rapid deceleration is important because thin boundary layers—being more stable than thick ones—are better able to tolerate substantial diffusion. In order to foster the mixing of the fluid jet which emanates from the nozzle 50 with the airstream flowing over the airfoil 12, it is preferred that the nozzle be oriented upwardly by an angle within the range of 2 to 15 degrees with respect to the direction of free stream immediately above the nozzle.

In another embodiment of the invention (FIG. 5), an airfoil 12A is provided with a trailing edge flap 60, with said flap having a first position which is typically used during straight-ahead flight, a second position typically used during aircraft take-off, and a third position typically used during aircraft landing. The A position corresponds to straight-ahead flight, the B position is typically used during take-off, and the C position is typically used during aircraft landing. As before, a nozzle 62 in communication with a source of pressurized gas is oriented for directing a gaseous jet over a portion of the airfoil 12A for boundary layer control. When the flap is in the B and C positions, it is advantageous to discharge a gaseous jet over the flap; but, there is little need for such gas when the flap is in its A position. Accordingly, it would be advantageous to place a valve (such as valve 64) in the conduit between the source of pressurized gas and the nozzle 62. A linkage 66 is provided between said valve 64 and the flap 60, so that the nozzle is in communication with the gas source only when the flap is in its B and C positions. That is, the gaseous jet emanating from nozzle 62 would be interrupted when the flap is in its A position. Preferably, the valve 64 is a proportional valve which is only partially open when the flap 60 is in its B position. When the source of pressurized gas is a part of the jet engine on an aircraft, the engine will typically constitute a source having a variable pressure—because the throttle setting for an aircraft which is taking off will be significantly different from the throttle setting for a landing aircraft. If the pressure of the gas available is great but the valve is only partially open, the quantity of gas vented through a fixed nozzle can be made to be substantially the same as the quantity of gas vented through a fully open valve when the supply pressure is lower. Accordingly, an expeditious manner of controlling the amount of gas which is vented from a nozzle is to slave a control means to a flap, whereby the fluid jet emanating from a nozzle is a function of the position of said flap. With such an arrangement it is inevitable that actuation of a particular control surface by moving it from its rest position will automatically furnish the gaseous jet that will improve the efficiency of the control surface. Perhaps it should be noted that modulation of a gaseous jet by physical displacement of a control surface need not be restricted to simply a trailing-edge flap; such a construction could also be employed in the embodiment shown in FIGS. 1 and 2, wherein upward displacement of the pivotable portion 24 can be used to open a control valve-in the same way that valve 64 is opened.

In one embodiment of the invention the gaseous fluid which is supplied to a boundary layer nozzle is air which is bled from an aircraft engine compressor. In order to achieve maximum thrust from the engine when it is needed, however, it is essential that there be a valve or other control means between the engine and the nozzle which forms part of the boundary layer control system. Ideally, the method of controlling the amount of air which is bled from a compressor involves partially opening the valve during aircraft take-off, when the engine is operating at full thrust and a substantial pressure is realizable from the compressor. When the aircraft is making a landing approach, however, its engine will typically be operating at a greatly reduced thrust, and a correspondingly lower pressure is realizable from the compressor. In this latter condition, the valve between the compressor and the nozzle would be fully opened. And, as suggested earlier, it is advantageous to adjust the opening of the valve by the independent act of establishing the position of a movable control surface. For example, an advantageous design includes the step of increasing the opening of the control valve in direct relation to the displacement of the aircraft's flaps from a normal, high-speed flight position.

Figure 5:
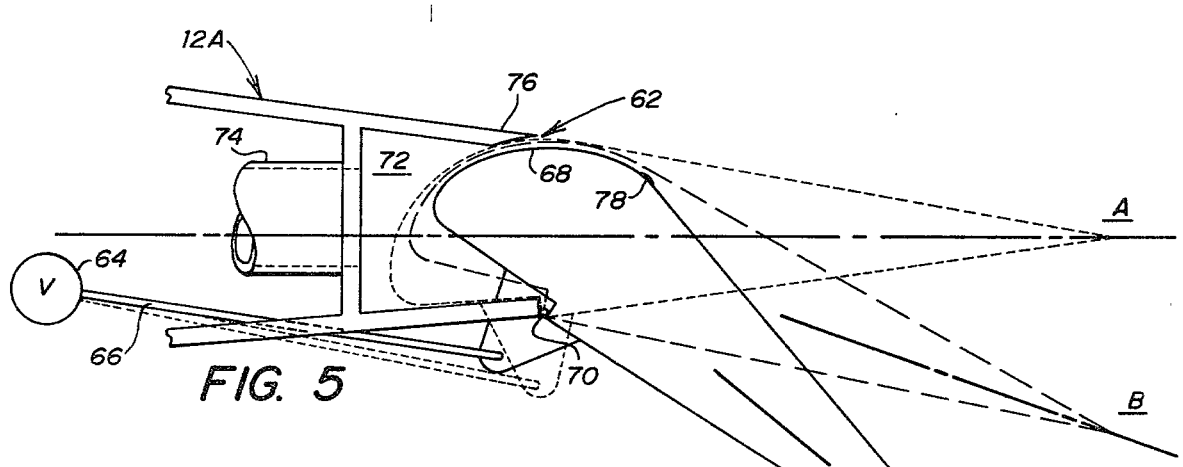
FIG. 5 is a fragmentary, cross-sectional view of an airfoil with a trailing edge flap, and said flap having multiple positions which are occupied by the flap during high speed, intermediate, and low speed flight.

The embodiment shown in FIG. 5 illustrates a particularly advantageous construction wherein the trailing edge flap 60 has an upper surface 68 which is not equally spaced from hingeline 70, such that rotating the flap downward about its hingeline serves to increase the size of the opening or nozzle 62. Hence, pressurized air from a compressor or the like which is supplied to plenum 72 by duct 74 will be vented from nozzle 62 in a quantity which is proportional to the downward displacement of the flap 60. In effect, the surface 68 operates as a control means for adjusting the discharge of compressed gas from its source; and, like proportional valve 64, it is responsive to positioning of the flap 60. That is, as the flap is lowered by a greater amount, the opening of nozzle 62 is increased, and a greater amount of gas may be vented over flap 60. When the flap 60 is raised to its cruise (or "A") position, the flow of gas can be essentially precluded. To improve the sealing of nozzle 62—when that is desired, a linear sealing means 78 (in the form of a resilient strip of rubber or the like) may be provided between the upper surface of flap 60 and the chamfered lip of structural member 76.

FIG. 6 shows a top view of an aircraft having a boundary layer control system as a part of the trailing edge of a wing. An air-supply duct 73 receives compressed air from a source (not shown in this figure) and conveys it for discharge over the flap 60. A flap actuator 80 is adapted to cause the flap 60 to be displaced in a conventional manner; and this same actuator may cause a valve or other control means to vary the quantity of gas discharged over the trailing edge flap 60 (or an upper connecting section 30), to improve lift and drag characteristics for both low and transonic speed. Of course, the profile of the trailing edge flap 60 does not exactly match that of the connecting section 30, which is made of several rigid and interconnected pieces. For this reason, the efficiency of the trailing edge system will not likely match that of the forward energization system. As can perhaps be better seen in FIG. 7, the convex portion of the connecting section 30 (immediately aft of the nozzle 50) constitutes an area which is aptly referred to as the energization zone; and it has a length approximately equal to the distance between the nozzle lip and point t in FIG. 4. The concave region in FIG. 7, where deceleration takes place, is as close an approximation to the geometry shown in FIG. 4 as can be achieved—without introducing too much complexity in the movable structures. The opportunity to exactly match the geometry of FIG. 4 in the trailing edge flap 60 is, of course, always present; but it is much more difficult to achieve, and so a compromise is more clearly dictated for trailing edge of an airfoil.

In an embodiment that has been successfully tested and operated in a remotely piloted vehicle (sometimes called a RPV), a ducted fan was employed as the source of pressurized fluid. Two elongated nozzles were provided on the wings, with the forward nozzle being located at approximately 25% chord; this nozzle was adapted to discharge air over a connecting section that was selectively movable in an upward direction as the pivotable frontal portion was elevated, such that the ratio of the thickness of the wing when the hinge plate was fully raised, in comparison to its thickness when the hinge plate was fully collapsed, was about two. The rear nozzle was positioned to discharge air only over the trailing edge flaps, and it was positioned at about 75% chord. The single ducted fan delivered air to a plenum that supplied both sets of nozzles. Adjustment of the discharge of fluid from the fan via the forward nozzle and over the connecting section was effected by utilizing an equivalent of valving means, namely, by varying the rotational speed of the fan. Further adjustment of the flow over the flaps was provided by using a self-regulating flap construction such as described above in connection with FIG. 5. The optimum flow from the nozzle is a flow which is at least sufficient for preventing any significant boundary layer separation in the region of the connecting surface. Aside from the unnecessary expenditure of energy, overblowing is generally of no significantly deleterious effect. The improved performance of the wing at low speeds was particularly impressive, making it quite apparent that a significant increase in lift had been realized as the dual-position wing was shifted from its thin profile to its thick configuration. The actual flight tests served to verify data obtained in wind tunnel tests, etc., wherein it was found that the high-velocity spike which typically occurs at the leading edge of an airfoil can be extended rearwardly for a significant distance. An increase in lift, at a given angle of attack, is inherently realized; and a larger portion of the lift is carried by the forward portion of the airfoil, thereby reducing trimming requirements. And, the addition of a blowing jet over a suitably contoured portion of an airfoil invariably produces more favorable boundary layer characteristics, reducing the tendency of the air flow to separate—and reducing drag.

Figure 3:
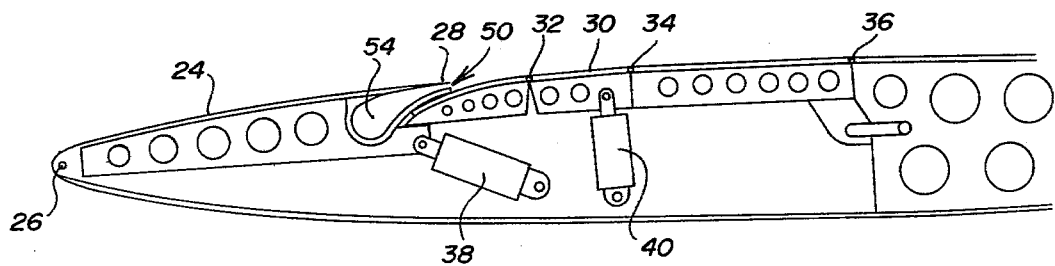
FIG. 3 is a fragmentary, cross-sectional view of the airfoil of FIG. 1 wherein the pivotable section is shown in its fully lowered position, such as it might be for high speed flight.

With regard to the optimum dimensions for a boundary layer control system as described herein, the length of the pivotable front section 24 will typically be within the range of 10% to 30% of the airfoil chord. And, the section 24 will typically be pivoted upward by an amount which will cause the "thick" configuration to be about twice its thin configuration; this will also usually be about 2% to 6% of the chord. The sequence of elevating the control surface will typically be as follows: the hydraulic actuator 40 will begin to push the movable structure upward, with the connecting structure moving (at least initially) as a unit, pivoting about hingeline 36. Concurrently, actuator 38 causes the aft end of pivotable section 24 to begin its elevation. When the mechanical stop below hingeline 36 reaches its limit, continued extension of the actuator 40 will cause rotation of the forward portion about hingeline 34. Eventually, the upstream edge of the folding section will lock into place behind the nozzle 50. The sequence for movement of both the forward section 24 and the connecting section 30 is such that the two sections should reach their extended position almost simultaneously, so as to minimize the disturbance of fluid flow over the wing during the transition. Perhaps it should also be noted that the curved shape of the lower wall of plenum 54 is designed for a specific purpose, namely, to serve as a sliding track for the forward external surface of the connecting section 30. That is, the lower wall of plenum 54 is curved, so as to guide the connecting section and maintain an exposed upper surface which is as smooth as practicable during the transition of the airfoil between the two modes shown in FIGS. 2 and 3.

While only certain preferred embodiments of the invention have been disclosed in detail herein, it will be apparent to those skilled in the art that modifications thereof can be made without departing from the spirit of the invention. Thus, any specific structure shown herein is intended to be exemplary and is not meant to be limiting, except as described in the claims appended hereto.

What is claimed is:

1. An airfoil construction, comprising:
 (a) upper and lower surface structure which connects leading and trailing edges so as to form a relatively thin profile which is adapted to foster high speed flight, with one portion of the upper surface structure being pivotable upward about a hinge line that coincides generally with the leading edge of the airfoil, for increasing the thickness of the airfoil, and the chordwise length of said pivotable portion being substantially less than the chord length;
 (b) a connecting section which forms part of the airfoil upper surface structure immediately aft of the pivotable portion, and said section being positionable for presenting a substantially continuous and rigid surface to the air moving over the upper surface structure during such times as the pivotable portion is being pivoted upward and downward, and the connecting section cooperating with the remainder of the airfoil upper surface when the connecting section is lowered to establish an elongated convex cross section for high speed fight, and the connecting section also cooperating with the remainder of the airfoil upper surface when the connecting section is fully raised to establish a compound curvature having both concave and convex portions for fostering low speed flight;
 (c) a rearwardly directed nozzle located adjacent the aft edge of the pivotable portion and oriented such that it can discharge a gaseous fluid over the connecting section;
 (d) a source of pressurized fluid adapted to be connected with said nozzle; and
 (e) control means for adjusting the discharge of fluid from said source over the connecting section.

2. In combination:
 (a) an airfoil;
 (b) a nozzle adapted to direct a jet of gaseous fluid over an upper surface of the airfoil;
 (c) a source of pressurized gaseous fluid;
 (d) control means for selectively placing the source of pressurized fluid in communication with the nozzle;
 (e) a hinged upper plate at the frontal portion of said airfoil's upper surface; and
 (f) a movable connecting section of rigid material which extends between the hinged upper plate and the remainder of the airfoil's upper surface when the upper plate is pivoted upward about its hinge line, and the connecting section cooperating with the remainder of the airfoil upper surface when the connecting section is lowered to establish an elongated convex cross-section for high speed flight, and the connecting section also cooperating with the remainder of the airfoil upper surface when the connecting section is fully raised to establish a compound curvature having both concave and convex portions for fostering low speed flight, and the movable connecting section including a surface portion which is defined by the formula:

$$y = (h/2) \cos 0.13(x/\delta),$$

wherein
 $y$ = the locus of points on the surface downstream from the nozzle, for respective distances x from said nozzle,
 $x$ = the distance downstream from the nozzle, measured in a direction parallel to the main-stream airflow at the nozzle,
 $\delta$ = the boundary layer thickness of the airflow immediately above the nozzle, and
 $h$ = the height of the nozzle above that point where deceleration of the airflow essentially ends, i.e., the "step height".

3. The combination as claimed in claim 2 wherein the ratio of the thickness of the airfoil when the hinged upper plate is fully raised in comparison to its thickness when the hinged plate is fully collapsed is about 2.

4. The method of achieving boundary layer control in a system which utilizes vented gas from an aircraft engine compressor, with there being a valve between the compressor and a nozzle on an airfoil, comprising the steps of:
 (a) partially opening the valve during aircraft takeoff, when the engine is operating at full thrust and a substantial pressure is realizable from the compressor;
 (b) fully opening the valve during aircraft landing, when the engine is operating at greatly reduced thrust and a correspondingly lower pressure is realizable from the compressor; and
 (c) venting compressed air from said compressor through a nozzle on the upper surface of at least one airfoil, and the airfoil being convertible from a thin cruise mode wherein the airfoil's upper surface is convex to a thicker mode for takeoff and landing, and the airfoil's thicker configuration including a compound curvature on the airfoil's upper surface having a generally convex shape which is followed by a generally concave cross-section, and the nozzle being located immediately ahead of the transition region where the airfoil thickness begins to change from an increasing thickness to a decreasing thickness as measured in a chordwise direction, such that compressed air is vented from the nozzle at a location just ahead of a generally convex portion of the thickened airfoil, and the mixture of mainstream airflow and vented compressor air immediately thereafter passes through a deceleration region having a generally concave shape, whereby substantial deceleration of the mainstream airflow occurs over the airfoil and ahead of any trailing edge flap.

* * * * *